United States Patent
Jiang et al.

(10) Patent No.: US 9,509,748 B2
(45) Date of Patent: Nov. 29, 2016

(54) EFFICIENT STORAGE AND RETRIEVAL OF RESOURCES FOR RENDERING STRUCTURED DOCUMENTS

(71) Applicant: Facebook, Inc., Menlo Park, CA (US)

(72) Inventors: Changhao Jiang, San Jose, CA (US); Erling Alf Ellingsen, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 97 days.

(21) Appl. No.: 14/199,788

(22) Filed: Mar. 6, 2014

(65) Prior Publication Data
US 2014/0189073 A1 Jul. 3, 2014

Related U.S. Application Data

(63) Continuation of application No. 12/849,646, filed on Aug. 3, 2010, now Pat. No. 8,676,978.

(51) Int. Cl.
*G06F 15/16* (2006.01)
*H04L 29/08* (2006.01)
*G06F 17/30* (2006.01)
*G06F 17/22* (2006.01)

(52) U.S. Cl.
CPC .......... *H04L 67/02* (2013.01); *G06F 17/2247* (2013.01); *G06F 17/30902* (2013.01)

(58) Field of Classification Search
None
See application file for complete search history.

(56) References Cited

U.S. PATENT DOCUMENTS

| | | | |
|---|---|---|---|
| 7,818,506 B1* | 10/2010 | Shepstone | G06F 17/30902 709/217 |
| 2003/0101234 A1 | 5/2003 | McBrearty et al. | |
| 2007/0216674 A1 | 9/2007 | Subramanian et al. | |
| 2009/0037517 A1 | 2/2009 | Frei | |
| 2011/0113201 A1* | 5/2011 | Midda | G06F 12/122 711/133 |
| 2012/0005429 A1 | 1/2012 | Kalasapur et al. | |
| 2012/0084346 A1 | 4/2012 | Mickens | |
| 2014/0280771 A1* | 9/2014 | Bosworth | H04L 67/10 709/219 |

OTHER PUBLICATIONS

Mickens, James, "Silo: Exploiting JavaScript and DOM Storage for Faster Page Loads," downloaded from http://research.microsoft.com/pubs/131524/paper.pdf on Aug. 3, 2010, Jun. 2010.
"HTML5, A vocabulary and associated API's for HTML and XHTML" *WC3 Working Draft 4* Mar. 2010, downloaded from http://www.w3.org/TR/2010/WD-html5-20100304/ on Aug. 3, 2010, Mar. 4, 2010.

* cited by examiner

*Primary Examiner* — John B Walsh
(74) *Attorney, Agent, or Firm* — Baker Botts L.L.P.

(57) ABSTRACT

In one embodiment, a method includes accessing local storage on the computing device. The local storage includes multiple local-storage slots that each currently correspond to a domain or sub-domain and includes one or more resources for a structured document associated with the particular domain or sub-domain. Each of the resources has a timestamp indicating when it was last used by the computing device. The method further includes identifying based on the timestamps one or more resources to be discarded from the local storage.

20 Claims, 4 Drawing Sheets

EFFICIENT STORAGE AND RETRIEVAL OF RESOURCES FOR RENDERING STRUCTURED DOCUMENTS

RELATED APPLICATION

This application is a continuation of U.S. patent application Ser. No. 12/849,646 filed Aug. 3, 2010 and entitled "EFFICIENT STORAGE AND RETRIEVAL OF RESOURCES FOR RENDERING STRUCTURED DOCUMENTS," which is currently pending.

TECHNICAL FIELD

The present disclosure relates generally to serving structured documents (such as web pages) to remote clients and, more particularly, to storing resources at remote clients and subsequently retrieving selected stored resources for use in efficiently rendering structured documents that reference such stored resources at the remote clients.

BACKGROUND

Conventionally, when a request for a web page or other structured document transmitted by a client device is received by a server or computing system hosting the web page, the hosting system typically generates a base web page in the form of a Hyper Text Markup Language (HTML), Extensible Markup Language (XML), or other web browser-supported structured document. The generated structured document is then transmitted in a response to the requesting client via a Hypertext Transfer Protocol (HTTP) or other suitable connection for rendering at the client device. The structured document may include one or more resources (e.g. a JavaScript resource, a Cascading Style Sheet (CSS) resource, an image resource, a video resource, etc.), or, more typically, references to such resources, embedded within the transmitted document. By way of example, a resource embedded in an HTML document may generally be included or specified within a script element, style element, image element, or object element, among others, depending on the type of resource. The element referencing or specifying the resource may include a source attribute (e.g., src) identifying a location of the resource to the client requesting the web page. Typically, upon receipt of the response, a web browser or other client application executing at the client device then constructs a document object model (DOM) representation of the received structured document and checks to see if any of the referenced resources are stored locally in the web browser's cache. Valid resources stored locally in the cache may then be inserted into the DOM. The referenced resources not stored locally in the web browser's cache are then requested by the web browser. Typically, the web browser sends a separate request to a server for each referenced resource not stored locally in the web browser's cache.

Unfortunately, the memory size of the web browser's cache is typically very small so that newly cached resources often displace previously cached resources that were received relatively recently. For example, it is often the case that cached resources may only remain in the cache for approximately a day, or even less before being erased to make room for new resources. Furthermore, as each requested web page may generally require a large number of resources, a large number of individual requests for individual required resources are often used to fetch the resources not cached locally. The large number of requests utilize bandwidth and generally delay the rendering of the requested web page.

DESCRIPTION OF EXAMPLE EMBODIMENTS

Figure 1:
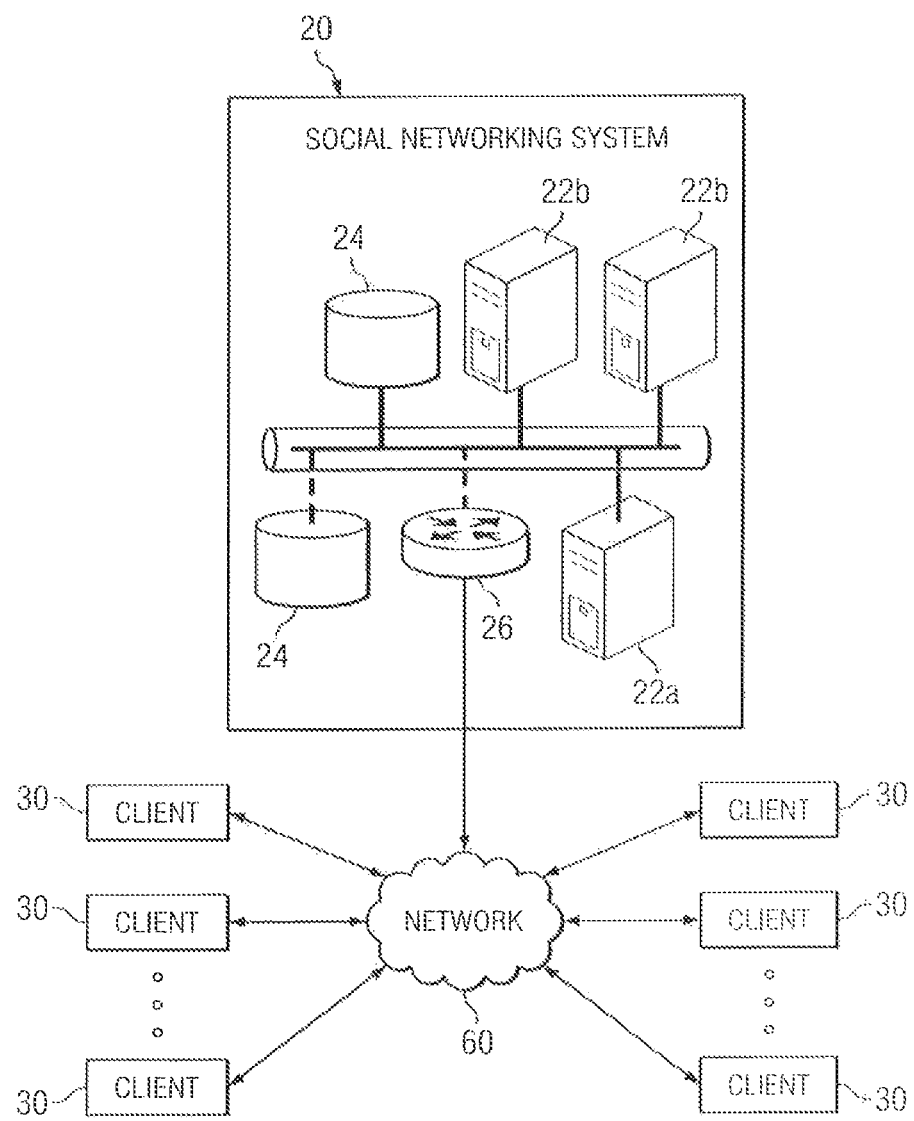
FIG. 1 illustrates an example network environment.

The present disclosure relates generally to serving structured documents (such as web pages) to remote clients and, more particularly, to storing resources at remote clients and subsequently retrieving selected stored resources for use in efficiently rendering structured documents that reference such stored resources at the remote clients. Particular embodiments relate to a resource manager stored and executable at a remote client device and configured to access a manifest or resource list (hereinafter manifest and resource list may be used interchangeably) associated with a structured document transmitted to the remote client device in response to a request for the structured document or associated web page or web application transmitted by the client device. In particular embodiments, the resource list includes one or more references to corresponding resources required to render the structured document to display an associated web page or web application at the remote client device. In particular embodiments, the resource manager accesses the resource list and identifies resources previously stored locally at the remote client device such as, for example, resources previously requested for rendering previously requested web pages, web applications, or other structured documents. In particular embodiments, the resources stored locally at the remote client device are stored in a persistent storage space of the remote client device and accessible and controllable via JavaScript. In particular embodiments, the persistent storage space is independent from the web browser's or other client document-rendering application's cache at the client device. In particular embodiments, the persistence storage space is the Local Storage space (hereinafter "Local Storage") defined by the World Wide Web Consortium (W3C) Web Storage specification and HTML5 specification.

In particular embodiments, resources referenced in the resource list that the resource manager determines are stored within Local Storage and which the resource manager determines are valid (e.g., current versions of the resources) are then retrieved by the resource manager and inserted in a model representation of the structured document for rendering by the web browser or other client document-rendering application executing at the remote client device. In particular embodiments, resources referenced in the resource list that the resource manager determines are not stored in Local Storage or are not valid in Local Storage (e.g., outdated or non-current versions of the resources) are then requested by the resource manager. In particular embodiments, the resource manager bundles multiple requests for resources into a single bundled request, or a reduced number of bundled requests, that is/are then transmitted to a server hosting the resources or having access to the resources in order to obtain the remaining needed resources for rendering the structured document. In particular embodiments, the resource manager subsequently stores the resources requested and obtained from the server(s) in Local Storage.

In particular embodiments, the resource manager includes, or is implemented with, executable JavaScript code and a JavaScript function library. In particular embodiments, the resource manager is transmitted to the remote client in a previously transmitted response such as in a response to a request transmitted from the remote client device for the resource manager or, alternately, included within the presently requested structured document, or a previously transmitted structured document, transmitted to the remote client device in the response to the request for the structured document transmitted by the client device. In particular embodiments, the resource manager itself is also stored within Local Storage.

By way of background, Web Storage and DOM Storage are web application software methods and protocols that are used to store data in or for a web browser or other document-rendering application. The W3C Web Storage specification introduces and defines Local Storage, or more particularly, the localStorage IDL attribute for use with the HTML5 (the proposed next standard for HTML 4.01, XHTML 1.0, and DOM Level 2 HTML) standard specification protocol. Notably, Local Storage is independent from a web browser's cache. The localStorage storage mechanism (hereinafter also referred to simply as "Local Storage" was designed for storage that spans multiple windows and that lasts beyond the current session. For Example, web applications may wish to store megabytes of user data, such as entire user-authored documents or a user's email mailbox, on the client side for performance reasons. Each Storage object implementing the Web Storage interface defined by the W3C Web Storage specification provides access to a list of key/value pairs (also referred to as items) where keys are strings and values can be any supported data type. Each Storage object is associated with a list of key/value pairs when it is created.

The localStorage object provides a Storage object for an origin (e.g., domain or subdomain). The W3C specification specifies that user agents (e.g., a client application implementing a network protocol used in communications within a client-server distributed computing system) must have a set of Local Storage areas or memory slots, one for each origin. That is, in Local Storage, each Local Storage slot stores data associated with one and only one domain or subdomain. According to the specification for Local Storage, user agents should expire (e.g., delete or erase) data from the Local Storage slots only for security reasons or when requested to do so by a user such as, for example, when a particular Local Storage area is full and new data is to be written to the particular Local Storage slot. When the localStorage attribute is accessed, the user agent checks if the document's effective script origin is the same origin as the document's origin and if the document's origin is a scheme/host/port tuple, and if so, checks if the user agent has allocated a Local Storage area for the origin of the document of the window object. If it has not, the user agent creates a new Local Storage slot for that origin. The user agent then returns the Storage object associated with that origin's Local Storage slot. The W3C specification also specifies that each document object must have a separate object for its Window's localStorage attribute.

Particular embodiments implement the resource manager described herein with JavaScript taking advantage of the fact that Local Storage is accessible and controllable with client-side JavaScript. This is in contrast to conventional web browser caches, which are transparent to JavaScript, and hence, it is not possible for a JavaScript process to determine what is in the web browser's cache. Additionally, as described above, the Local Storage space is comprised of fixed-sized slots or memory arrays, each for storing data for one and only one subdomain. This is also in contrast to conventional web browser caches, which do not reserve slots for different subdomains and generally store data for all web pages or web applications according to a FIFO (first-in-first-out) mechanism. That is, as a web browser cache becomes full, new data received by the web browser is stored in the cache causing the oldest data in the cache to be discarded or erased. In contrast, by using Local Storage to store data within separate Local Storage slots, data in a Local Storage slot can only be discarded and erased to make room for new data from the same subdomain and not by new data from other subdomains.

Local Storage also possesses other features of conventional web browsers. By way of example, Local Storage has the same or similar domain restrictions as web browsers (thus, one reason why each domain or subdomain is assigned its own reserved slot in Local Storage). Conceptually, this means that different subdomains cannot share and access data in one another's Local Storage slots. For example, data stored in Local Storage for www.facebook.com would not be able to be referenced or accessed by apps.facebook.com, and vice versa. Similarly, apps.facebook.com would not be able to cause data to be stored in the Local Storage slot assigned to www.facebook.com, and vice versa. However, as will be described below, particular embodiments are able to work around this limitation.

In various example embodiments, one or more described web pages, web applications, or other structured documents may be associated with a social networking system or social networking environment. However, alternate embodiments may generally have application to the retrieval and rendering of structured documents hosted by any type of network addressable resource or web site. Additionally, as used herein, a "user" may be an individual, an entity (such as a business, organization, or third party application), or a group of individuals or entities. Furthermore, as used herein, "or" may imply "and" as well as "or;" that is, "or" does not necessarily preclude "and," unless explicitly stated or implicitly implied.

Particular embodiments may operate in a wide area network environment, such as the Internet, including multiple network addressable systems. FIG. 1 illustrates an example network environment, in which various example embodiments may operate. Network cloud 60 generally represents one or more interconnected networks, over which the systems and hosts described herein can communicate. Network cloud 60 may include packet-based wide area networks (such as the Internet), private networks, wireless networks, satellite networks, cellular networks, paging networks, and the like. As FIG. 1 illustrates, particular embodiments may operate in a network environment comprising social networking system 20 (also referred to herein as social networking environment 20) and remote client devices 30. Client devices 30 are operably connected to the network environment and social networking system 20 via a network service provider, a wireless carrier, or any other suitable means.

In one example embodiment, social networking system 20 comprises computing systems that allow users to communicate or otherwise interact with each other and access content, such as user profiles, as described herein. Social networking system 20 is a network addressable system that, in various example embodiments, comprises one or more physical servers 22 and data store 24. The one or more physical servers 22 are operably connected to computer network 60 via, by way of example, a set of routers and/or networking switches 26. In an example embodiment, the functionality hosted by the one or more physical servers 22 may include web or HTTP servers, FTP servers, as well as, without limitation, web pages and applications implemented using Common Gateway Interface (CGI) script, PHP Hypertext Preprocessor (PHP), Active Server Pages (ASP), Hyper Text Markup Language (HTML), Extensible Markup Language (XML), Java, JavaScript, Asynchronous JavaScript and XML (AJAX), and the like.

Physical servers 22 may host functionality directed to the operations of social networking system 20. By way of example, social networking system 20 may host a website that allows one or more users, at one or more client devices 30, to view and post information, as well as communicate with one another via the website. Hereinafter servers 22 may be referred to as server 22, although server 22 may include numerous servers hosting, for example, social networking system 20, as well as other content distribution servers, data stores, and databases. Data store 24 may store content and data relating to, and enabling, operation of the social networking system as digital data objects. A data object, in particular implementations, is an item of digital information typically stored or embodied in a data file, database or record. Content objects may take many forms, including: text (e.g., ASCII, SGML, HTML), images (e.g., jpeg, tif and gif), graphics (vector-based or bitmap), audio, video (e.g., mpeg), or other multimedia, and combinations thereof. Content object data may also include executable code objects (e.g., games executable within a browser window or frame), podcasts, etc. Logically, data store 24 corresponds to one or more of a variety of separate and integrated databases, such as relational databases and object-oriented databases, which maintain information as an integrated collection of logically related records or files stored on one or more physical systems. Structurally, data store 24 may generally include one or more of a large class of data storage and management systems. In particular embodiments, data store 24 may be implemented by any suitable physical system(s) including components, such as one or more database servers, mass storage media, media library systems, storage area networks, data storage clouds, and the like. In one example embodiment, data store 24 includes one or more servers, databases (e.g., MySQL), and/or data warehouses.

Data store 24 may include data associated with different social networking system 20 users and/or client devices 30. In particular embodiments, the social networking system 20 maintains a user profile for each user of the system 20. User profiles include data that describe the users of a social network, which may include, for example, proper names (first, middle and last of a person, a trade name and/or company name of a business entity, etc.) biographic, demographic, and other types of descriptive information, such as work experience, educational history, hobbies or preferences, geographic location, and additional descriptive data. By way of example, user profiles may include a user's birthday, relationship status, city of residence, and the like. The system 20 may further store data describing one or more relationships or connections between different users. The relationship information may indicate users who have similar or common work experience, group memberships, hobbies, or educational history. A user profile may also include privacy settings governing access to the user's information is to other users.

Client device 30 is generally a computer or computing device including functionality for communicating (e.g., remotely) over a computer network. Client device 30 may be a desktop computer, laptop computer, personal digital assistant (PDA), in- or out-of-car navigation system, smart phone or other cellular or mobile phone, or mobile gaming device, among other suitable computing devices. Client device 30 may execute one or more client applications, such as a web browser (e.g., Microsoft Windows Internet Explorer, Mozilla Firefox, Apple Safari, Google Chrome, and Opera, etc.), to access and view content over a computer network. In particular implementations, the client applications allow a user of client device 30 to enter addresses of specific network resources to be retrieved, such as resources hosted by social networking system 20. These addresses can be Uniform Resource Locators, or URLs. In addition, once a page or other resource has been retrieved, the client applications may provide access to other pages or records when the user "clicks" on hyperlinks to other resources. By way of example, such hyperlinks may be located within the web pages and provide an automated way for the user to enter the URL of another page and to retrieve that page.

A web page or resource embedded within a web page, which may itself include multiple embedded resources, may include data records, such as plain textual information, or more complex digitally encoded multimedia content, such as software programs or other code objects, graphics, images, audio signals, videos, and so forth. One prevalent markup language for creating web pages is the Hypertext Markup Language (HTML). Other common web browser-supported languages and technologies include the Extensible Markup Language (XML), the Extensible Hypertext Markup Language (XHTML), JavaScript, Cascading Style Sheet (CSS), and, frequently, Java. By way of example, HTML enables a page developer to create a structured document by denoting structural semantics for text and links, as well as images, web applications and other objects that can be embedded within the page. Generally, a web page may be delivered to a client as a static document; however, through the use of web elements embedded in the page, an interactive experience may be achieved with the page or a sequence of pages. During a user session at the client, the web browser interprets and displays the pages and associated resources received or retrieved from the website hosting the page, as well as, potentially, resources from other websites.

More particularly, HTML enables developers to embed objects or resources, including web applications, images, or videos, within a structured document such as a web page. Generally, an HTML structured document is written in the form of HTML elements that consist of tags (surrounded by angle brackets) within the structured document content, which act as indicators to a web browser rendering the structured document as to how the document is to be interpreted by the web browser and ultimately presented on a user's display. By way of example, HTML elements may represent headings, paragraphs, hypertext links, embedded media, and a variety of other structures. HTML can include or can load scripts in languages such as JavaScript, which affect the behavior of HTML processors such as conventional web browsers, and Cascading Style Sheets (CSS), which define the appearance and layout of text and other content. HTML elements are the basic components for HTML and have two basis properties: attributes and content. Each element's attribute and content have certain restrictions that must be followed for an HTML element to be considered valid. An HTML element usually has a start tag (e.g., <element-name>) and an end tag (e.g., </element-name>). The element's attributes are contained in the start tag and content is located between the tags (e.g., <element-name attribute="value">Content</element-name>).

By way of example, HTML elements include structural elements (e.g., describing the purpose of text or other content), presentational elements (e.g., describing the appearance of text or other content regardless of its function), and Hypertext elements (e.g., making part of a document into a link to another document). Most elements can take any of several common attributes. By way of example, the id attribute provides a document-wide unique identifier for an element, the class attribute provides a way of classifying similar elements, and the title attribute is used to attach subtextual explanation to an element. HTML also defines several data types for element content, such as script data and stylesheet data, and numerous types for attribute values, including, by way of example, IDs, names, URIs or URLs, numbers, units of length, languages, media descriptors, colors, character encodings, dates and times, etc.

Document structure elements include the root element (defined by the starting and ending tags <html> and </html>, respectively), head elements (defined by the starting and ending tags <head> and </head>, respectively), and body elements (defined by the starting and ending tags <body> and </body>, respectively). The root element tags <html> and </html> delimit the beginning and end of an HTML document, respectively. All other HTML elements of a given HTML document are included within the root element. The head element tags <head> and </head> generally define a container for processing information and metadata for an HTML document. Example document head elements found within the head element container include, by way of example and not by way of limitation, the base element (defined by starting and ending tags <base> and </base>, respectively), which specifies a base uniform resource locator (URL) for all relative href and other links in the HTML document, the link element (defined by starting and ending tags <link> and </link>, respectively), which specifies links to other documents (e.g., for external CSS files), the meta element (defined by starting and ending tags <meta> and </meta>, respectively), which can be used to specify additional metadata about an HTML document, the object element (defined by starting and ending tags <object> and </object>, respectively), used for including generic objects within the document header, the script element (defined by starting and ending tags <script> and </script>, respectively), which can act as a container for script instructions (e.g., JavaScript) or a link to an external script with the src (source) attribute, the style element (defined by starting and ending tags <style> and </style>, respectively), which specifies a style for the document and which can act as a container for style instructions (e.g., for inlined CSS rules), and the title element (defined by starting and ending tags <title> and </title>, respectively), which defines a document title.

The body element <body> represents a container for the displayable content of an HTML document. Example body elements include, by way of example and not by way of limitation, block elements (e.g., basic text and list elements, among others), inline elements (e.g., anchor and phrase elements), and image and object elements. A script element positioned within the body element may be used to place a script in the document (e.g., the script element may contain instructions to dynamically generate block or inline content). The image element (defined by starting and ending tags <img> and </img>, respectively) may be used to insert an image into the document. By way of example, the image element may include an src attribute that specifies a URL where the image is located. The object element (defined by starting and ending tags <object> and </object>, respectively) may be used to insert an object into the document of the type specified in an included type attribute. Another frequently used HTML element is the frameset element, which may be used as an alternative to the body element.

Generally, a web application is an application that may be accessed via a web browser or other client application over a network, or a computer software application that is coded in a web browser-supported language and reliant on a web browser to render the application executable. Web applications have gained popularity largely as a result of the ubiquity of web browsers, the convenience of using a web browser launched at a remote computing device as a client (sometimes referred to as a thin client), and the corresponding ability to update and maintain web applications without distributing and installing software on remote clients. Often, to implement a web application or render a web page, the web application or web page requires access to one or more resources provided at a backend server of an associated website. Additionally, web application or web pages may often require access to additional resources associated with other applications.

Social networking system 20 may include a multitude of features with which users at remote clients 30 may interact during user sessions. In particular embodiments, these features may be implemented as web applications and may utilize JavaScript and CSS resources requested from servers 22 as well as other external servers or data stores. The web applications or resources may be embedded in various web pages served to remote clients, such as in frames or iFrames, sections or "divs" and the like. In particular embodiments, the social networking system 20 maintains in data store 24 a number of objects for the different kinds of items with which a user may interact while accessing social networking system 20. In one example embodiment, these objects include user profiles, application objects, and message objects (such as for wall posts, emails and other messages). In one embodiment, an object is stored by the system 20 for each instance of its associated item. These objects and the actions discussed herein are provided for illustration purposes only, and it can be appreciated that an unlimited number of variations and features can be provided on a social networking system 20.

As described above, a web page or underlying structured document may be segmented or divided into sections logically, visually, or otherwise. By way of example, the structured document used to encode the web page may include one or more block-level elements denoted by starting and ending HTML <div> tags. By way of background, for common web browsers, displayable elements of a web page can be rendered as either block or inline. While all elements are part of the document sequence, block elements appear within their parent elements as rectangular objects, which do not break across lines, and with block margins, and width and height properties, which can be set independently of the surrounding elements. Conversely, inline elements are treated as part of the flow of document text; they cannot have margins, width or height set, and may break across lines.

Typically, inline elements cannot be placed directly inside the body element; they must be wholly nested within block-level elements.

As another example, a web page may also be split into one or more frames as structurally specified using HTML Frame elements (e.g., denoted by starting and ending tags <frame> and </frame>, respectively). Frames allow a web browser display window to be split into segments, each of which can show a different document. Another frame element is the inline frame element (denoting by starting and ending tags <iframe> and </iframe>, respectively). An inline frame places another HTML structured document in a frame. Unlike an object element, an inline frame can be the "target" frame for links defined by other elements.

Hereinafter, any logical, structural, or visual section or portion of a web page or the structured document used to encode the web page, such as a block-level element, frame, or inline frame, among others, may hereinafter each be referred to as a "pagelet."

When a user at a client device (e.g., client device 30) desires to view a particular web page, web application, or other structured document (hereinafter also referred to as the "target structured document") hosted, at least in part, by social networking system 20 or accessible via social networking system 20, the client device's web browser, or other client-side document-rendering engine or suitable client application (hereinafter referred to as "web browser" for simplicity), formulates and transmits a request to social networking system 20. The request generally includes a URL or other document identifier as well as metadata or other information. By way of example, the request may include information identifying the user, such as a user ID, as well as information identifying or characterizing the web browser or operating system running on the user's client computing device 30. The request may also include location information identifying a geographic location of the user's client device 30 or a logical network location of the user's client device. The request may also include a timestamp identifying when the request was transmitted.

Figure 2:
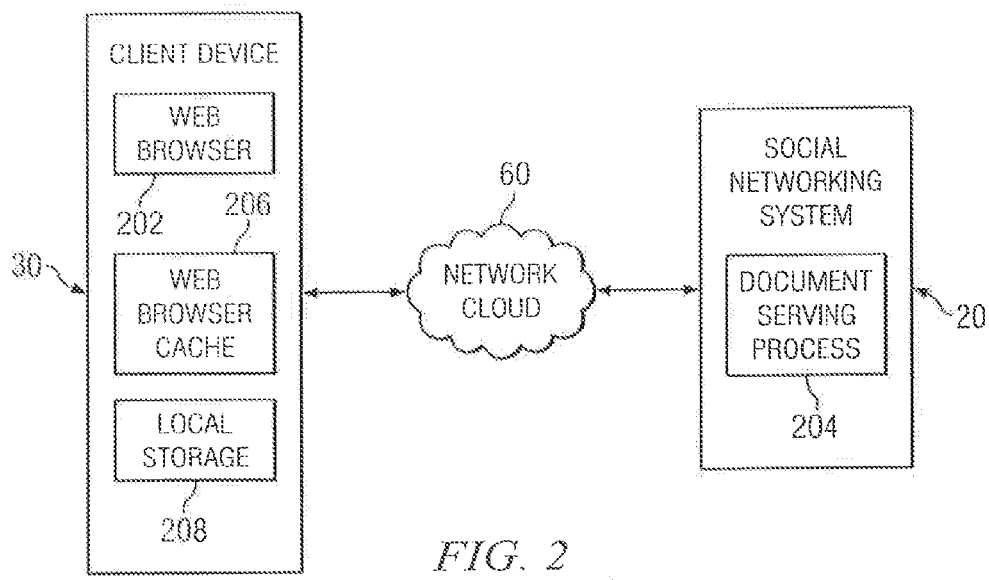
FIG. 2 illustrates a block diagram of example components of the example network environment of FIG. 1.

A method for serving a request for a web page will now be described with reference to the block diagram of FIG. 2 and the flowcharts of FIGS. 3 and 4. In an example embodiment, referring initially to the flowchart of FIG. 3, the method begins at 302 with receiving, by a server 22 or other computing system in social networking system 20, a request from a web browser 202 at a client device 30 for a target structured document hosted, at least in part, by social networking system 20 or accessible by social networking system 20. As described above, the request generally includes a URL or other document identifier corresponding to an associated web page or web application location, as well as metadata or other information. By way of example, the request may include information identifying the user of the web browser 202 making the request, such as a user ID, as well as information identifying or characterizing the web browser 202 or operating system running on the user's client device 30. Certain information of the request may be embodied in a browser cookie or other state object appended to the request. The request may also include location information identifying a geographic location of the user's client device 30 or a logical network location of the user's client device. The request may also include a timestamp identifying when the request was transmitted. An authentication process running in the server 22 or other computing system of social networking system 20 may first determine, at 304, whether the user making the request is authorized to receive the requested web page (e.g., has the user successfully logged in and is the user requesting a page for which the user has access or administrative rights).

In particular embodiments, document-serving process 204 then analyzes the request and, at 306, identifies resources needed to render the requested target structured document. At 308, document-serving process 204 assembles or generates a manifest or resource list that includes references to resources such as, by way of example and not by way of limitation, JavaScript, CSS, image, or other resources, required for rendering the target structured document. Document-serving process 204 generates, at 310, a structured document using markup language code (e.g., HTML, XML, or other suitable markup language code) for rendering the requested target structured document. In particular embodiments, the structured document includes a head element (e.g., an HTML head element) and a body element (e.g., an HTML body element). In particular embodiments, the body element includes markup language code as well as the resource list. In particular embodiments, the resource list is a JavaScript readable list (e.g., a text file) of references (including corresponding src identifiers) to be accessed and read by the resource manager referenced above and described in more detail below. In one embodiment, document-serving process 204 or other process in server 22 or data store 24 assigns a unique identifier to each resource. In one particular embodiment, the unique identifier for each resource takes the form of a hash value of the data of the resource, which may identify a version of the resource file. The reference to a resource may additionally or alternately include a file name, timestamp and/or other suitable or appropriate information. In one embodiment, each reference to a resource in the resource list includes a filename of the resource and the corresponding unique identifier (hash). In another embodiment, each reference to a resource includes only the hash. The body element may also include one or more actual resources themselves or other content to be rendered once received by the requesting client 30. In an alternate embodiment, the resource list may be transmitted within the head element. The head element may also include one or more actual resources (e.g., JavaScript or CSS). However, in particular embodiments, it is desirable to minimize the number of actual initial resources included in the structured document (e.g., to expedite the transmitting of the structured document to the requesting client 30).

In one embodiment, the structured document additionally includes executable code for implementing a Resource Manager at the remote client device 30. In various example embodiments, the executable code for implementing Resource Manager at client device 30 is transmitted in the head element or body element of the structured document. In particular embodiments, the executable code for implementing Resource Manager comprises a JavaScript code segment and includes a JavaScript function library.

In one embodiment, the structured document further includes a call to a Resource Manager, which may already be stored at the remote client device 30, as described below. However, in an alternate particular embodiment, the structured document includes an inline script that, when downloaded by web browser 202, checks whether a Resource Manager is already stored at the client device 30, and in particular embodiments, whether the Resource Manager is already stored in Local Storage 208, as described below.

In particular embodiments, document-serving process 204 then formulates and transmits an initial response or initial response portion (hereinafter also referred to as a "first response" or "first response portion") at 312 to the requesting client 30 that includes the structured document (It should be noted that in some embodiments, some data such as, for example, pre-fetching instructions may be transmitted to the client prior to transmitting the initial/first response/response portion). The initial response may be transmitted to the requesting client 30 over an HTTP or any other suitable connection. In one particular embodiment, the connection over which the initial response is transmitted to the client 30 is a persistent Transmission Control Protocol (TCP) connection.

Referring now to the flowchart of FIG. 4, client device 30, and particularly web browser 202, subsequently receives the response including the structured document at 402. In one embodiment, web browser 202 then begins rendering the structured document by processing the response and the structured document and generating, at 404, a model representation of the structured document in browser cache 206 or other suitable memory location. In one example embodiment, web browser 202 generates a Document Object Model (DOM) representation of the structured document. As will be appreciated by those of skill in the art, when web browser 202 generates the DOM representation, it translates the markup language code in the structured document into a DOM tree or DOM hierarchy of DOM elements or nodes, each of which may include or contain resources, references for resources, or content, among other possibilities.

In an embodiment in which the structured document includes executable code (e.g., JavaScript) for implementing Resource Manager at the client device 30, the executable code for implementing Resource Manager may be loaded and initialized, at 406, in browser cache 206 upon receipt by web browser 202. Upon being loaded and initialized, Resource Manager may begin executing in some embodiments. In other embodiments, and in some embodiments in which the executable code for implementing the Resource Manager at the client device 30 was not included in the structured document, Resource Manager may be loaded, at 406, into browser cache 206 and begin executing after being called by a call embedded within the structured document. By way of example, in some cases, Resource Manager may already be stored locally within client device 30, and in particular embodiments, within Local Storage 208, as a result of being transmitted to client device 30 in a previous response to a request for a previously requested and received structured document or in an explicit request for the Resource Manager. In still other embodiments, and particularly those in which the Resource Manager is not yet stored locally, the embedded call to the Resource Manager may cause web browser 202 or other client application to formulate and transmit a request to server 22 or other location for the executable code for implementing Resource Manager at client device 30. In such a case and embodiment, server 22 or other server then transmits the executable code for implementing Resource Manager to client device 30 where it is then loaded, at 406, into web browser cache 206 where the executable code is initialized and Resource Manager begins executing.

In another particular embodiment, in which the structured document includes an inline script as referenced above, the inline script, when executed by web browser 202, may first determine whether Resource Manager is already stored in Local Storage 208. If so, the inline script, when executed by web browser 202, may cause Resource Manager to be loaded, at 406, into browser cache 206. If not, the inline script, when executed by web browser 202, may transmit a request, or cause web browser 202 to transmit a request, to server 22 or other location to obtain the executable code for implementing Resource Manager at the client device 30. In such a case and embodiment, server 22 or other server then transmits the executable code for implementing Resource Manager to client device 30 where it is then loaded, at 406, into web browser cache 206 where the executable code is initialized and Resource Manager begins executing.

In particular embodiments, Resource Manager then accesses, at 408, the resource list, also stored in web browser cache 206, that was transmitted with or within the structured document. Resource Manager then, for each resource referenced in the resource list, determines, at 410, whether the resource is stored locally within client device 30, and in particular embodiments, within Local Storage 208. By way of example, Resource Manager may compare the hash included with each resource reference to hashes in a hash table, which, in particular embodiments, is stored within Local Storage 208 and managed/maintained by Resource Manager. The hashes in the hash table correspond to resources already stored locally within Local Storage 208. As each hash is unique, if a hash specified in the resource list matches a hash in the hash table, Resource Manager determines that a valid copy of the referenced resource is stored locally within Local Storage 208. On the other hand, if a hash specified in the resource list does not match a hash in the hash table, Resource Manager determines that a valid copy of the referenced resource is not stored locally within Local Storage 208. In the latter case, this means that no version of the resource is stored within Local Storage 208 or that a copy of the referenced resource stored locally is no longer valid (e.g., out of date or not current). Notably, Resource Manager does not need to read the filenames of resources referenced in the resource list as only the hashes are needed to determine whether a valid copy of a referenced resource is stored in Local Storage 208 because each hash uniquely identifies each version of each resource.

Resource Manager then retrieves or causes to be retrieved, at 412, the valid referenced resources stored in Local Storage 208. Resource Manager may then insert or load, or cause to be loaded, the retrieved resources into the DOM representation at 414. In one example embodiment, to load a particular retrieved resource into the DOM representation at 414, Resource Manager first determines what type of resource the retrieved resources is (e.g., JavaScript, CSS, image, etc.). In one embodiment, for each retrieved resource, resource manager generates starting and ending tags (e.g., HTML tags) and inserts the resource's attributes and content within the tags for evaluation by web browser 202, insertion into the DOM representation, and rendering by web browser 202 for display to the user. By way of example, if the resource is a JavaScript resource, Resource Manager may generate starting and ending script tags for the JavaScript resource. Similarly, if the resource is a CSS resource, Resource Manager may generate starting and ending style tags for the CSS resource. Similarly, if the resource is an image, Resource Manager may generate starting and ending image tags for the image resource. Alternately, rather than generating tags dynamically, various tags may be generated proactively or otherwise pre-generated or pre-stored within Local Storage 208 where such tags may be subsequently retrieved for use by Resource Manager 208 in loading the retrieved resources.

At 416, Resource Manager formulates and transmits (or causes to be transmitted) one or more requests to server 22 or other internal or external servers (e.g., a third party site) where the needed resources are located or accessible from, in order to obtain the referenced resources determined at 410 to not have valid copies stored within Local Storage 208. In one embodiment, Resource Manager bundles all the requests for the needed resources into a single request. In other cases, it may be desirable or necessary to bundle and transmit certain selected needed resource requests together as one request and to bundle other selected needed resource requests together in a separate request or requests. By way of example, one set of resources may be served by one server and another set may be served by another server. As another example, Resource Manager may know that server 22 or other server may have already pre-packaged a subset of needed resources together. As another example, as the Resource Manager may formulate a request for needed resources as a URL comprised of a concatenation of the hashes corresponding to the needed resources, it is possible that, due to browser or other limitations, the maximum size of the URL may not fit all of the hashes corresponding to the needed resources, and thus, multiple requests may be required. In still other embodiments, the Resource Manager may formulate and transmit multiple requests for other optimization reasons or based on some function or functions that dictate which resources should be requested together, the maximum size of each request, or the maximum number of resources desired in each request. In particular embodiments, Resource Manager only formulates and transmits requests for referenced resources determined at 410 to not have valid copies stored within Local Storage 208. In particular embodiments, one or more of the requests transmitted at 416 may be transmitted over the same persistent connection over which the structured document was received. In particular embodiments, the requests transmitted at 416 may be formulated and transmitted using AJAX techniques, other asynchronous techniques, or other suitable techniques.

When a server (e.g., server 22) receives a request transmitted at 416, the server may then locate and retrieve the requested resources and transmit the resources in one or more responses back to the client device 30. In one embodiment, in response to receiving a bundled request for multiple resources, server 22 is configured to package the requested resources in a single bundled package for transmission back to client device 30, and in one example embodiment, transmit the bundled package of resources over the same persistent connection that the structured document was transmitted over. Additionally, in some embodiments, server 22 may be configured to pre-package commonly requested resources or resources that are commonly requested together as described in U.S. patent application Ser. No. 12/543,367 filed 18 Aug. 2009 and titled ADAPTIVE PACKAGING OF NETWORK RESOURCES, which is hereby incorporated by reference herein. In such cases, it is possible that the bundled package of resources transmitted to client device 30 may include resources not requested by Resource Manager. Additionally, in such embodiments, and is a case where a pre-packaged bundle of resources has been previously served to the client 30 and stored in Local Storage 208, if even one of the resources is not current or valid, then in some embodiments, the whole package is requested again. Alternately, Resource Manager could be optimized to, in such a case, inform the server 22 not to send the whole bundled package; rather, to request only the resource or resources usually pre-packaged together that are not current or valid in Local Storage 208, hence saving bandwidth.

In particular embodiments in which Resource Manager is implemented with JavaScript, to process and ultimately store in Local Storage 208 the needed resources referenced in the resource list not already stored in Local Storage 208, the resources in the response(s) from server 22 (or other server) transmitted in response to the request(s) transmitted at 416, are transmitted in the form of one or more strings, rather than in a conventional HTTP response in which an HTTP header indicates the type of resource(s) contained in the response. As each of the one or more responses containing resources requested by Resource Manager are received by client device 30, Resource Manager separates the resources (if packaged together) and, at 418, interprets the string(s) in the response. That is, Resource Manager analyzes each string corresponding to a resource to identify what type of resource the string represents (e.g., JavaScript, CSS, image, etc.). Resource Manager may then load, or cause to be loaded, the interpreted resource strings into the DOM representation at 420 as similarly described above with reference to step 414. By way of example, if a string corresponds to a JavaScript resource, Resource Manager inserts the string between script tags for evaluation by web browser 202 and insertion into the DOM representation. Resource Manager may then store, at 422, the resources received in response to the request(s) at 416 in Local Storage 208 in their assigned Local Storage slot corresponding to the top-level page web subdomain.

Additionally, in particular embodiments, each time a resource is loaded, whether from Local Storage 208 at 414 or from a response at 420, Resource Manager subsequently timestamps the resource with a timestamp indicating when the resource was accessed, retrieved, loaded or some other appropriate and useful time. In particular embodiments, these timestamps may be used to select which resources of the resources stored in the particular Local Storage slot should be discarded. By way of example, in one embodiment, Resource Manager uses a least-recently-used (LRU) algorithm to delete old resources or other files from the particular Local Storage slot to make room for new resources or other data. That is, Resource Manager determines, using the timestamp data stored with or for the resources in the Local Storage slot, which of the resources were the least recently used (i.e., the resource that have not been used for the longest time periods). In particular embodiments, Resource Manager deletes the least recently used resources to make room for new resources when the assigned Local Storage slot is full. However, in alternate embodiments, as described below, the effective storage allocation for a particular subdomain may be extended by taking advantage of other Local Storage slots.

In particular embodiments, to decrease the perceived rendering time of the requested target structured document, Resource Manager defers or delays the storing, at 422, of the resources received in response to the request(s) at 416 in Local Storage 208 until after the structured document is rendered or during some other inactive period or downtime. That is, the requested resources are loaded into the DOM representation at 420 before being stored at 422 in their assigned Local Storage slot corresponding to the top-level page web subdomain. Similarly, Resource Manager may defer or delay the writing of timestamp data for corresponding resources to Local Storage 208 until the structured document is rendered or during some other inactive period or downtime. Similarly, if Resource Manager has not yet been stored in Local Storage 208, Resource Manager may be stored in Local Storage 208 after the structured document is rendered or during some other inactive period or downtime. By way of example, Resource Manager may store the new resources or the resource timestamp data after being triggered by an on-load event. More particularly, when the structured document is finished loading, including the resources referenced in the resource list, an on-load event notification may notify Resource Manager that the document is done loading. Resource Manager may then store any resource or timestamp data (e.g., write the resource data and timestamp data) or perform any other deferred write operations in the corresponding assigned slot in Local Storage 208.

As described above, there are domain/subdomain restrictions with Local Storage. The Local Storage domain restriction is based on the domain of the top-level page. As an example, consider a case in which Resource Manager was transmitted to a client device 30 in a response served from www.facebook.com. In many cases, the resource list sent in the response from the subdomain www.facebook.com may include references to resources stored in other Local Storage slots such as, by way of example, a Local Storage slot for the subdomain apps.facebook.com and thus, it would be useful to retrieve these resources from the Local Storage slot assigned to apps.facebook.com for use in rendering the structured document for www.facebook.com. In particular embodiments, two sites (e.g., www.facebook.com and apps.facebook.com) that share the same common top-level domain (i.e., facebook.com) may communicate despite failing the same origin check by mutually setting their respective document.domain DOM properties to the same qualified, right-hand fragment of their current host name. For example, if http://www.facebook.com/ and http://apps.facebook.com/ both set document.domain to "facebook.com", they would be from that point on considered as from the same-origin for the purpose of DOM manipulation. However, this would still not enable www.facebook.com to access the resources in the Local Storage slot assigned to apps.facebook.com, and vice versa. To overcome this limitation, when server 22 formulates and transmits a structured document for one subdomain, server 22 may also be configured to insert an HTML inline frame (iframe) in the structured document that corresponds to a second different subdomain thus enabling Resource Manager to access resources from the Local Storage slots assigned to both subdomains. By way of example, server 22 may know that numerous resources required for rendering a web page from apps.facebook.com may be stored locally at the client device 30 in the Local Storage slot assigned and reserved for www.facebook.com. Thus, when generating the structured document for serving the web page from apps.facebook.com, server 22, or particularly page-serving process 204, inserts an iframe into the structured document that places another HTML document for the subdomain www.facebook.com in a frame. In this way, resources in the Local Storage slot assigned to www.facebook.com can be accessed and retrieved for use in loading and rendering the structured document for apps.facebook.com.

Generally, in various embodiments, it is not important where the executable JavaScript or other code for implementing Resource Manager is obtained from (e.g., from what subdomain). Thus, generally, the executable JavaScript or other code for implementing Resource Manager may be obtained from any domain or subdomain. However, in order to allow the inline script or call described above to access the Resource Manager from Local Storage 208, the Resource Manager must be stored in a Local Storage slot accessible by the subdomain for which the response containing the structured document including the inline script or call was transmitted. As just described, this may be achieved by serving the executable code for implementing the Resource Manager from one main subdomain (e.g., www.facebook.com) so that it is then stored within Local Storage 208 in a Local Storage slot assigned to the main subdomain and also including, within the structured documents transmitted from other subdomains (e.g., apps.facebook.com), iframes for the main domain or subdomain (e.g., www.facebook.com). In this way, the inline scripts or calls in the structured documents from the other subdomains have access to the Resource Manager stored within Local Storage 208 in the slot assigned to the main subdomain and may then load the resource manager, or cause it to be loaded, within browser cache 206 where it may begin executing. Alternately, a copy of the executable code for implementing the Resource Manager may be stored within each slot in Local Storage 208 corresponding to a respective subdomain where a structured document may be received.

A similar technique may also be used to expand the effective storage allocation in Local Storage 208 assigned to a particular subdomain. More particularly, as each assigned storage slot within Local Storage 208 has a fixed amount of memory, the effective storage allocation for a particular subdomain may be extended by inserting iframes pointing to other subdomains into structured documents transmitted from the particular subdomain. By way of example, the effective storage allocation for www.example.com may be effectively increased beyond the Local Storage slot assigned to www.example.com by including, in structured documents transmitted from www.example.com, iframes pointing to other subdomains such as, by way of example, 1.example.com, 2.example.com, 3.example.com, etc., thereby increasing the effective storage allocation for www.example.com to that of the storage slots in Local Storage 208 assigned to www.example.com, 1.example.com, 2.example.com, and 3.example.com.

Particular embodiments may further relate to efficiently rendering web pages, and particularly dynamic web pages, using asynchronous techniques as described in, for example, U.S. patent application Ser. No. 12/553,064 filed 2 Sep. 2009 and titled PAGE RENDERING FOR DYNAMIC WEB PAGES, which is hereby incorporated by reference herein. More specifically, particular embodiments relate to systems, methods, and logic for rendering a target web page that reduces or eliminates the browser overhead associated with reloading content (whether accessed remotely from a server and/or locally from a cache) and re-executing scripts that were downloaded in connection with one or more previously rendered web pages. Particular embodiments utilize AJAX techniques to request only the new content and resources that are necessary to render the target web page without causing a browser or underlying client application to unnecessarily naively re-render the entire web page. More particularly, AJAX techniques are used to only request resources not stored in Local Storage 208. Furthermore, responses transmitted from servers using AJAX techniques include resource lists, as described above, that contain references to the resources required to render the newly requested web page or new portion of a dynamic web page.

Particular embodiments may further relate to a phased approach to serving a requested structured document, such as a web page as described, by way of example, in U.S. patent application Ser. No. 12/638,910 filed 15 Dec. 2009 and titled PREDICTIVE RESOURCE IDENTIFICATION AND PHASED DELIVERY OF STRUCTURED DOCUMENTS, which is hereby incorporated by reference herein. In particular embodiments, when a request for a particular web page is received by the host server 22 or system, the host checks a data array (e.g., within data store 24) to identify the resources that are likely to be required in rendering the web page. In particular embodiments, the host transmits references to these resources in a first resource list, as described above, in a first response or first response portion that corresponds to a first portion of the requested web page. Subsequently, the host proceeds to generate the remainder of the requested web page and formulates a second response or second response portion that includes the rest of the web page and a second resource list that contains references to the required resources not transmitted in the first response portion. In this way, the client device may start retrieving the resources identified in the first resource list (e.g., from Local Storage if available or by requesting the resources not in Local Storage as described above) in the first response portion, such as embedded scripts and style sheets, while the rest of the web page is being generated by the host, thereby potentially reducing the time required to render the web page at the client device. In particular embodiments, all resources actually required for rendering the web page (as determined when the web page is generated by the host) are logged in a resource utilization log, while resources not used to render the web page, including unused or unnecessary resources referenced in the first response portion, are not logged in the resource utilization log.

Furthermore, in particular embodiments, to optimize the insertion of CSS resources, or more particularly, to minimize the number of CSS resource insertions, at 414 or 420, Resource Manager attempts to aggregate the CSS insertions. By way of example, this may prove especially beneficial in embodiments in which the structured document is rendered progressively such as, by way of example, as described in U.S. patent application Ser. No. 12/754,549 filed 5 Apr. 2010 and titled PHASED GENERATION AND DELIVERY OF STRUCTURED DOCUMENTS, which is hereby incorporated by reference herein. In such embodiments, when a request for a particular web page or web application is received by server 22, server 22 generates and transmits to the requesting client device 30 an initial response or initial response portion that includes a "base" or "skeletal" structured document including markup language code (e.g., HTML) for rendering one or more place-holders, as well as executable code that, when received by the client device 30, implements a client-side page-assembling process. After the initial response is received by the client device 30, a client-side document-rendering application (e.g., a web browser 202) renders the base structured document including the place-holders. In particular embodiments, after generating and transmitting the initial response, server 22 then launches one or more server-side page- or subpage-generating processes that each generate a respective secondary portion of the requested web page, referred to as a pagelet, including markup language code (e.g., HTML) and a resource list that includes one or more references of resources required to render the pagelet. Once a page-generating process completes a secondary portion of the requested web page, the secondary portion may then be transmitted to the client in a secondary response or secondary response portion. In an alternate embodiment, the host may generate each secondary portion sequentially in-process, which may generally not involve launching one or more other page-generating processes. In particular embodiments, after each of one or more secondary responses are received, the client-side page-assembling process may dynamically insert, or cause the client-side document-rendering application to insert, the secondary portion of the requested web page received in the secondary response, into the model representation (e.g., DOM representation) of the base structured document at a corresponding place-holder of the model representation for rendering by the document-rendering application. In this way, the client may render the base structured document while the rest of the web page, including one or more pagelets (included in the remaining one or more secondary portions), is being generated by the server 22, thereby potentially reducing the time required to render the web page at the client.

In such embodiments, each secondary response portion may include its own resource list and incline script or call to Resource Manager. In such embodiments, as each pagelet in a secondary response portion is received by client device 30, it may include a resource list that references a first set of CSS resources. Subsequently, when another pagelet in another secondary response portion is received by client device 30, the second pagelet may include a resource list that references a second set of CSS resources. Without any optimization, each of the first and second sets of CSS resources would be loaded separately upon receipt. However, CSS loading may trigger reflow of the page content which can be very expensive. Thus, in particular embodiments, it is desirable to aggregate the CSS loading to minimize the number of CSS loading operations. Thus, in particular embodiments, whenever CSS resources are to be loaded, the CSS resource loading operation is deferred or delayed by a small time interval. By way of example, a timer may be triggered by a first CSS resource loading event and set to expire after a small time period (e.g., 20 ms). If another second CSS resource loading operation (e.g., for a subsequently received pagelet) is not triggered before expiration of the timer, the first CSS resource loading operation is performed. However, if the second CSS resource loading operation is triggered before expiration of the timer, the timer is reset and both the first and second CSS resource loading operations are deferred, and so on and so forth.

Particular embodiments described achieve two conflicting goals: storing resources within a remote client device for future use at a fine granularity (e.g., at the individual resource level in particular cases or embodiments) while also not sacrificing network efficiency. More particularly, by way of example, when a resource has been updated or otherwise changed at the server hosting the resource, it may be desirable to invalidate and potentially erase the invalid version of the resource in Local Storage 208. In particular embodiments, the invalidation and discarding of resources may be performed at the individual resource level even if the resources were packaged together when first received by the client device 30, thus, the whole package of resources does not need to be invalidated and discarded. Furthermore, to retrieve a valid copy of an invalid resource stored in Local Storage 208, the resource manager, in particular embodiments, only requests the needed resource(s) even if the needed resource(s) was/were originally transmitted as a package of multiple resources. Moreover, while maintaining fine granularity in storing resources, particular embodiments don't sacrifice network efficiency as Resource Manager may formulate and transmit a single bundled request for the needed resources (or a reduced number of bundled requests) rather than transmitting an individual request for each needed resource.

Additionally, although the described embodiments were described as using Local Storage, in some alternate embodiments, other suitable storage spaces may be used, and particularly, other persistent web storage spaces that are accessible and controllable with JavaScript. By way of example, in other embodiments, DOM storage or Flash Local Storage may be used in place of Local Storage defined by the W3C and HTML5.

Figure 3:
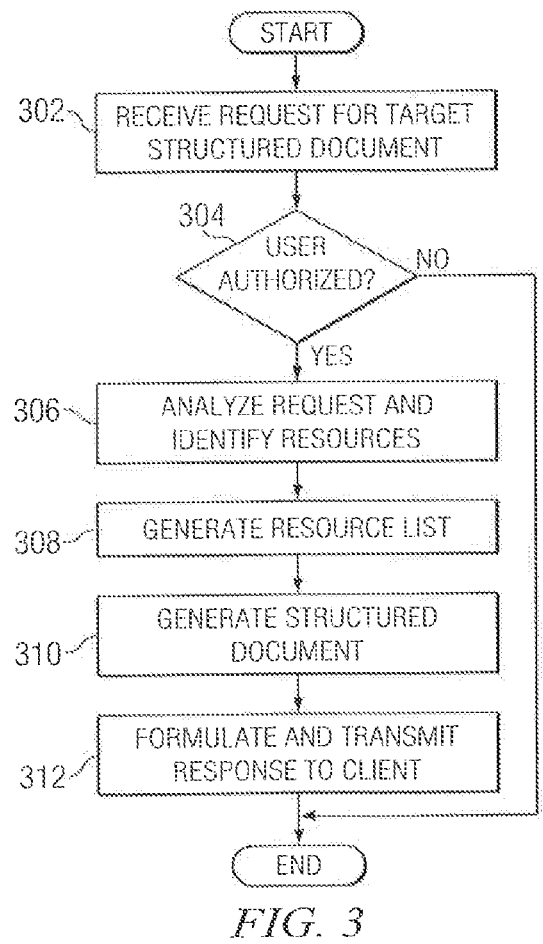
FIG. 3 shows a flowchart illustrating an example method for serving a request for a web page, web application, or other structured document.
Figure 4:
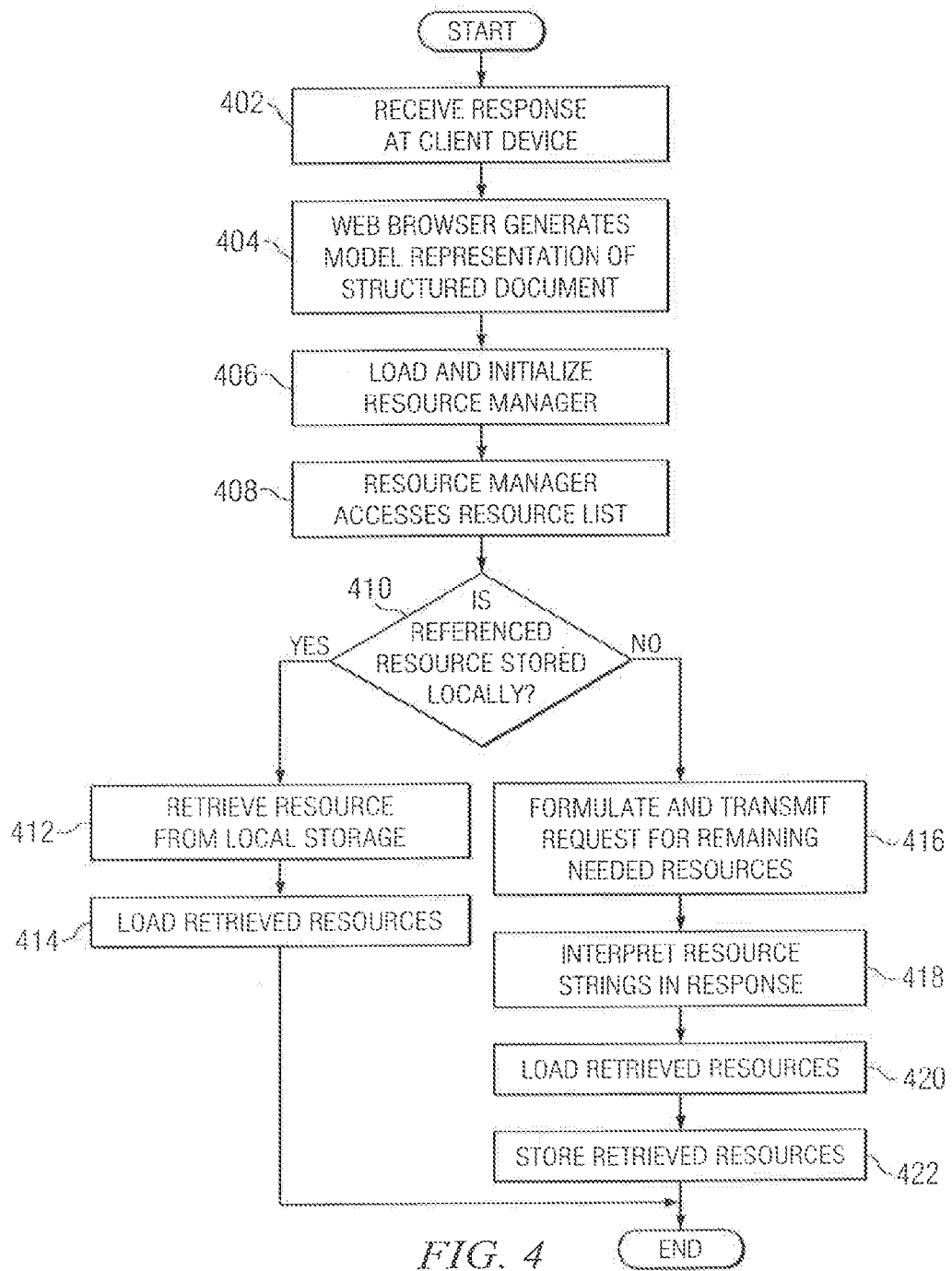
FIG. 4 shows a flowchart illustrating an example method for retrieving and loading resources for use in rendering a requested web page, web application, or other structured document.

Although the present disclosure describes and illustrates particular steps of the methods or processes of FIGS. 3 and 4 as occurring in a particular order, the present disclosure contemplates any suitable steps of the methods of FIGS. 3 and 4 occurring in any suitable order. Moreover, although the present disclosure describes and illustrates particular components carrying out particular steps of the methods of FIGS. 3 and 4, the present disclosure contemplates any suitable combination of any suitable components carrying out any suitable steps of the methods of FIGS. 3 and 4.

The applications and/or processes described herein can be implemented as a series of computer-readable instructions, embodied or encoded on or within a tangible data storage medium, that when executed are operable to cause one or more processors to implement the operations described above. While the foregoing processes and mechanisms can be implemented by a wide variety of physical systems and in a wide variety of network and computing environments, the computing systems described below provide example computing system architectures of the server and client systems described above, for didactic, rather than limiting, purposes.

Figure 5:
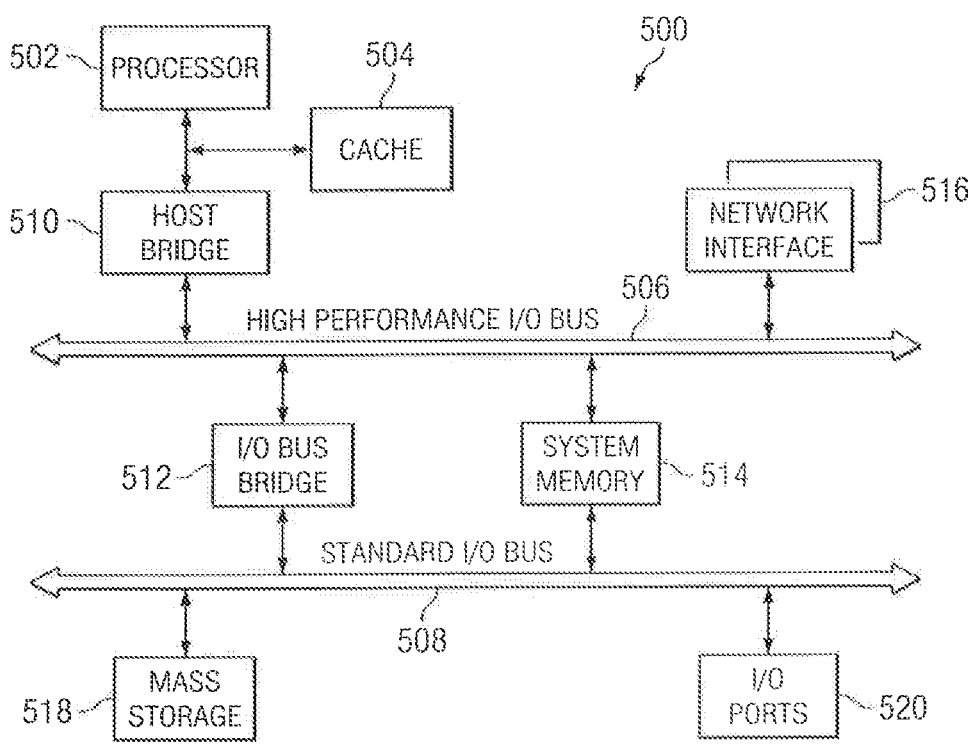
FIG. 5 illustrates an example computer system architecture.

FIG. 5 illustrates an example computing system architecture, which may be used to implement a server 22a, 22b, or a client device 30. In one embodiment, hardware system 500 comprises a processor 502, a cache memory 504, and one or more executable modules and drivers, stored on a tangible computer readable medium, directed to the functions described herein. Additionally, hardware system 500 includes a high performance input/output (I/O) bus 506 and a standard I/O bus 508. A host bridge 510 couples processor 502 to high performance I/O bus 506, whereas I/O bus bridge 512 couples the two buses 506 and 508 to each other. A system memory 514 and one or more network/communication interfaces 516 couple to bus 506. Hardware system 500 may further include video memory (not shown) and a display device coupled to the video memory. Mass storage 518 and I/O ports 520 couple to bus 508. Hardware system 500 may optionally include a keyboard and pointing device, and a display device (not shown) coupled to bus 508. Collectively, these elements are intended to represent a broad category of computer hardware systems, including but not limited to general purpose computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

The elements of hardware system 500 are described in greater detail below. In particular, network interface 516 provides communication between hardware system 500 and any of a wide range of networks, such as an Ethernet (e.g., IEEE 802.3) network, a backplane, etc. Mass storage 518 provides permanent storage for the data and programming instructions to perform the above-described functions implemented in the servers 22a, 22b, whereas system memory 514 (e.g., DRAM) provides temporary storage for the data and programming instructions when executed by processor 502. I/O ports 520 are one or more serial and/or parallel communication ports that provide communication between additional peripheral devices, which may be coupled to hardware system 500.

Hardware system 500 may include a variety of system architectures; and various components of hardware system 500 may be rearranged. For example, cache 504 may be on-chip with processor 502. Alternatively, cache 504 and processor 502 may be packed together as a "processor module," with processor 502 being referred to as the "processor core." Furthermore, certain embodiments of the present invention may not require nor include all of the above components. For example, the peripheral devices shown coupled to standard I/O bus 508 may couple to high performance I/O bus 506. In addition, in some embodiments, only a single bus may exist, with the components of hardware system 500 being coupled to the single bus. Furthermore, hardware system 500 may include additional components, such as additional processors, storage devices, or memories.

In one implementation, the operations of the embodiments described herein are implemented as a series of executable modules run by hardware system 500, individually or collectively in a distributed computing environment. In a particular embodiment, a set of software modules and/or drivers implements a network communications protocol stack, parallel computing functions, browsing and other computing functions, optimization processes, and the like. The foregoing functional modules may be realized by hardware, executable modules stored on a computer readable medium, or a combination of both. For example, the functional modules may comprise a plurality or series of instructions to be executed by a processor in a hardware system, such as processor 502. Initially, the series of instructions may be stored on a storage device, such as mass storage 518. However, the series of instructions can be tangibly stored on any suitable storage medium, such as a diskette, CD-ROM, ROM, EEPROM, etc. Furthermore, the series of instructions need not be stored locally, and could be received from a remote storage device, such as a server on a network, via network/communications interface 516. The instructions are copied from the storage device, such as mass storage 518, into memory 514 and then accessed and executed by processor 502.

An operating system manages and controls the operation of hardware system 500, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Of course, other implementations are possible. For example, the functions described herein may be implemented in firmware or on an application specific integrated circuit.

Furthermore, the above-described elements and operations can be comprised of instructions that are stored on storage media. The instructions can be retrieved and executed by a processing system. Some examples of instructions are software, program code, and firmware. Some examples of storage media are memory devices, tape, disks, integrated circuits, and servers. The instructions are operational when executed by the processing system to direct the processing system to operate in accord with the invention. The term "processing system" refers to a single processing device or a group of inter-operational processing devices. Some examples of processing devices are integrated circuits and logic circuitry. Those skilled in the art are familiar with instructions, computers, and storage media.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. By way of example, while embodiments of the present disclosure have been described as operating in connection with a social networking website, various embodiments of the present invention can be used in connection with any communications facility that supports web pages or web applications. Furthermore, in some embodiments the term "web service" and "web site" may be used interchangeably and additionally may refer to a custom or generalized API on a device, such as a mobile device (e.g., cellular phone, smart phone, personal GPS, personal digital assistance, personal gaming device, etc.), that makes API calls directly to a server.

The invention claimed is:

1. A method comprising:
by a computing device, accessing local storage on the computing device, wherein:
the local storage comprises a plurality of local-storage slots that are each assigned to a domain or sub-domain, wherein one or more of the local-storage slots store one or more resources for a structured document associated with the particular domain or sub-domain, the structured document is prevented from accessing resources stored in one or more local-storage slots assigned to one or more other structured documents; and
each of the resources has a timestamp indicating when it was last used by the computing device;
by the computing device, determining that a local-storage slot assigned to a domain or sub-domain associated with the structured document is full;
by the computing device, identifying based on the timestamps one or more least-recently-used resources to be discarded from the local-storage slot; and
by the computing device, deleting the one or more identified resources from the local-storage slot.

2. The method of claim 1, wherein the timestamps indicate when the resources were last accessed, retrieved, or loaded by the computing device.

3. The method of claim 1, wherein one or more of the resources to be discarded are least recently used among all resources in the local storage.

4. The method of claim 1, wherein one or more of the resources to be discarded are least recently used among a subset of the resources in the local storage.

5. The method of claim 1, wherein one or more of the resources are to be discarded from the local storage to make room for one or more new resources to be stored in one or more local-storage slots in the local storage.

6. The method of claim 5, wherein:
the new resources are associated with a particular domain or sub-domain that currently corresponds to one or more local-storage slots in the local storage;
the resources to be discarded are in one or more of the local-storage slots currently corresponding to the particular domain or sub-domain; and
the new resources are to be stored in the local-storage slots that the resources to be discarded are in, and the particular local-storage slots in the local storage are to continue to correspond to the particular domain or sub-domain.

7. The method of claim 5, wherein:
the resources to be discarded are associated with a first domain or sub-domain that currently corresponds to one or more particular local-storage slots in the local storage;
the new resources are associated with a second domain or sub-domain; and
the new resources are to be stored in the local-storage slots that the resources to be discarded are in, and the particular local-storage slots in the local storage are to then correspond to the second domain or sub-domain.

8. One or more computer-readable non-transitory storage media embodying software that is operable when executed to:
access local storage on a computing device, wherein:
the local storage comprises a plurality of local-storage slots that are each assigned to a domain or sub-domain, wherein one or more of the local-storage slots store one or more resources for a structured document associated with the particular domain or sub-domain, the structured document is prevented from accessing resources stored in one or more local-storage slots assigned to one or more other structured documents; and
each of the resources has a timestamp indicating when it was last used by the computing device;
determine that a local-storage slot assigned to a domain or sub-domain associated with the structured document is full;
identify based on the timestamps one or more least-recently-used resources to be discarded from the local-storage slot; and
delete the one or more identified resources from the local-storage slot.

9. The media of claim 8, wherein the timestamps indicate when the resources were last accessed, retrieved, or loaded by the computing device.

10. The media of claim 8, wherein one or more of the resources to be discarded are least recently used among all resources in the local storage.

11. The media of claim 8, wherein one or more of the resources to be discarded are least recently used among a subset of the resources in the local storage.

12. The media of claim 8, wherein one or more of the resources are to be discarded from the local storage to make room for one or more new resources to be stored in one or more local-storage slots in the local storage.

13. The media of claim 12, wherein:
the new resources are associated with a particular domain or sub-domain that currently corresponds to one or more local-storage slots in the local storage;
the resources to be discarded are in one or more of the local-storage slots currently corresponding to the particular domain or sub-domain; and
the new resources are to be stored in the local-storage slots that the resources to be discarded are in, and the particular local-storage slots in the local storage are to continue to correspond to the particular domain or sub-domain.

14. The media of claim 12, wherein:
the resources to be discarded are associated with a first domain or sub-domain that currently corresponds to one or more particular local-storage slots in the local storage;
the new resources are associated with a second domain or sub-domain; and
the new resources are to be stored in the local-storage slots that the resources to be discarded are in, and the particular local-storage slots in the local storage are to then correspond to the second domain or sub-domain.

15. A system comprising:
one or more processors; and a memory coupled to the processors comprising instructions executable by the processors, the processors being operable when executing the instructions to:

access local storage on a computing device, wherein:
        the local storage comprises a plurality of local-storage slots that are each assigned to a domain or sub-domain, wherein one or more of the local-storage slots store one or more resources for a structured document associated with the particular domain or sub-domain, the structured document is prevented from accessing resources stored in one or more local-storage slots assigned to one or more other structured documents; and
        each of the resources has a timestamp indicating when it was last used by the computing device;
    determine that a local-storage slot assigned to a domain or sub-domain associated with the structured document is full;
    identify based on the timestamps one or more least-recently-used resources to be discarded from the local-storage slot; and
    delete the one or more identified resources from the local-storage slot.

16. The system of claim 15, wherein the timestamps indicate when the resources were last accessed, retrieved, or loaded by the computing device.

17. The system of claim 15, wherein one or more of the resources to be discarded are least recently used among all resources in the local storage.

18. The system of claim 15, wherein one or more of the resources to be discarded are least recently used among a subset of the resources in the local storage.

19. The system of claim 15, wherein one or more of the resources are to be discarded from the local storage to make room for one or more new resources to be stored in one or more local-storage slots in the local storage.

20. The system of claim 19, wherein:

the new resources are associated with a particular domain or sub-domain that currently corresponds to one or more local-storage slots in the local storage;

the resources to be discarded are in one or more of the local-storage slots currently corresponding to the particular domain or sub-domain; and the new resources are to be stored in the local-storage slots that the resources to be discarded are in, and the particular local-storage slots in the local storage are to continue to correspond to the particular domain or sub-domain.

* * * * *